United States Patent [19]

Reneau et al.

[11] 4,387,390

[45] Jun. 7, 1983

[54] AUTOMATIC BEAM CURRENT LIMITER

[75] Inventors: Daniel L. Reneau, Elmhurst; Christopher M. Engel, Arlington Heights, both of Ill.

[73] Assignee: Zenith Radio Corporation, Glenview, Ill.

[21] Appl. No.: 205,820

[22] Filed: Nov. 10, 1980

[51] Int. Cl.³ ............................................. H04N 9/20
[52] U.S. Cl. .................................................... 358/74
[58] Field of Search ........................... 358/60, 74, 243

[56] References Cited
FOREIGN PATENT DOCUMENTS 804102  11/1958  United Kingdom .................. 358/74

*Primary Examiner*—Robert L. Richardson
*Attorney, Agent, or Firm*—Jack Kail

[57] ABSTRACT

An automatic beam current limiting circuit for a color television receiver comprises means for individually monitoring the three cathode currents developed in response to the green, blue and red video drive signals. The video processing unit of the receiver is automatically adjusted in response to any one of the cathode currents exceeding a predetermined level for reducing the video drive signals to limit the excessive cathode current to the predetermined level. As a result, the individual cathode currents are limited to the predetermined level while the combined cathode currents are allowed to substantially exceed this level.

10 Claims, 2 Drawing Figures

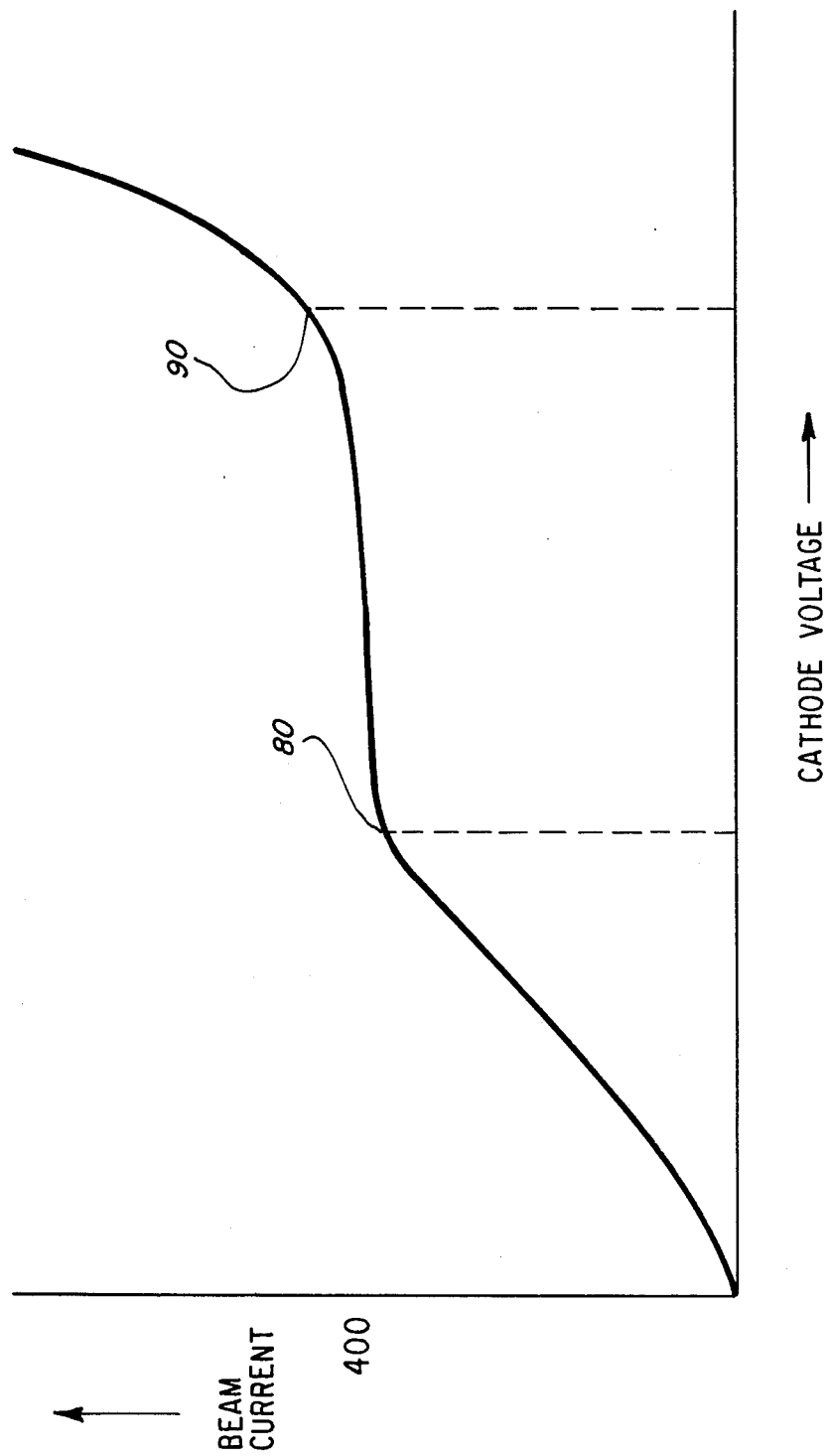

AUTOMATIC BEAM CURRENT LIMITER

BACKGROUND OF THE INVENTION

The present invention relates to apparatus for automatically limiting the cathode ray tube beam currents in a video display system and has particular utility when used in association with a projection television system.

Television receivers frequently include circuits for limiting cathode ray tube beam currents to prevent damage such as phosphor burnout and aperture mask distortion resulting from the intense heat generated by excessive current levels. Typically, prior art beam current limiting circuits operate by developing a signal which is proportional to the total beam current, i.e. the sum of the individual beam currents produced by each of the three electron guns of the cathode ray tube, and using the developed signal to adjust the gain and/or drive of the video processing unit of the receiver. Therefore, in response to the development of an excessive total beam current, the gain or drive of the video processing unit is automatically reduced thereby reducing each of the individual beam currents by a proportionate amount. The signal proportional to the total beam current is normally developed by sensing the high voltage anode current supplied to the cathode ray tube or the low voltage current supplied to the high voltage horizontal output transformer. Prior art circuits exemplary of the foregoing are disclosed in U.S. Pat. Nos. 3,842,201, 3,924,067, 4,079,424, 4,096,518, 4,137,552 and 4,207,591.

In the prior art automatic beam current limiting circuits, each electron gun of the cathode ray tube may be operated for producing the maximum allowed total beam current. That is, if, for example, the circuit is set for initiating limiting action at a threshold total beam current of one milliampere, when a pure green field is being displayed by the cathode ray tube, the green gun will be allowed to produce one milliampere of beam current before the limiter becomes effective. Likewise, when a pure blue or pure red field is displayed by the cathode ray tube, the blue and red electron guns could be operated for producing one milliampere beam currents. Of course, if more than one of the electron guns where being operated at any given time, the threshold total beam current of one milliampere would be shared among the operating guns prior to initiation of the limiting action. While these operating characteristics produce satisfactory results in conjunction with a conventional television receiver, certain problems arise when an attempt is made to incorporate such beam current limiting circuits in, for example, projection television receiver systems.

More particularly, projection television systems commonly employ three separate cathode ray tubes each having a plastic lens associated therewith for focusing either green, red or blue light onto an image display screen. In order to prevent damage to the lenses, the heat associated with the light beams developed by each respective cathode ray tube must be limited to a value corresponding to a predetermined beam current level, this predetermined level typically being on the order of about 400 microamperes. Thus, the maximum beam current in each of the three cathode ray tubes must be limited to a value of about 400 microamperes. At the same time, however, in order to provide an acceptably bright white field image display and to take advantage of the maximum capability of the sweep and high voltage system, the total beam current should preferably be allowed to assume a value substantially greater than the foregoing predetermined level, for example, up to about one milliampere. Accordingly, in order to prevent damage to the focusing lenses while, at the same time, providing an acceptable white field image display, the beam current produced by each respective cathode ray tube must be limited to a value of about 400 microamperes with the total beam current being allowed to assume values of up to about one milliampere, this value being determined for any particular receiver by the limitations of the horizontal sweep transformer. It will be appreciated that the prior art total beam current sensing circuits discussed above are inherently incapable of achieving this result. In particular, if the circuit is set for initiating limiting action at a total beam current of 400 microamperes to correspondingly limit the beam current produced by each respective cathode ray tube to protect the associated focusing lenses, then an acceptable white field image cannot be produced. On the other hand, if the circuit is set for initiating limiting action at a total beam current of one milliampere to provide an acceptable white field image, then inadequate protection is provided for the focusing lenses since each individual beam current could assume the one milliampere limiting level.

Accordingly, it is an object of the present invention to provide an improved automatic beam current limiting circuit which is particularly useful in association with a projection television receiver.

Another object of the invention is to provide an automatic beam current limiting circuit for limiting the beam currents in each cathode ray tube of a projection television receiver system to a predetermined level while allowing the total combined beam current to assume a value substantially larger than the predetermined level.

BRIEF DESCRIPTION OF THE DRAWINGS

These and other objects and features of the present invention will be more readily understood from the following detailed description of the invention taken in conjunction with the drawings, in which:

FIG. 2 is a graph illustrating the operating characteristics of the beam current limiting circuit of the invention.

DESCRIPTION OF THE PREFERRED EMBODIMENT

Figure 1:
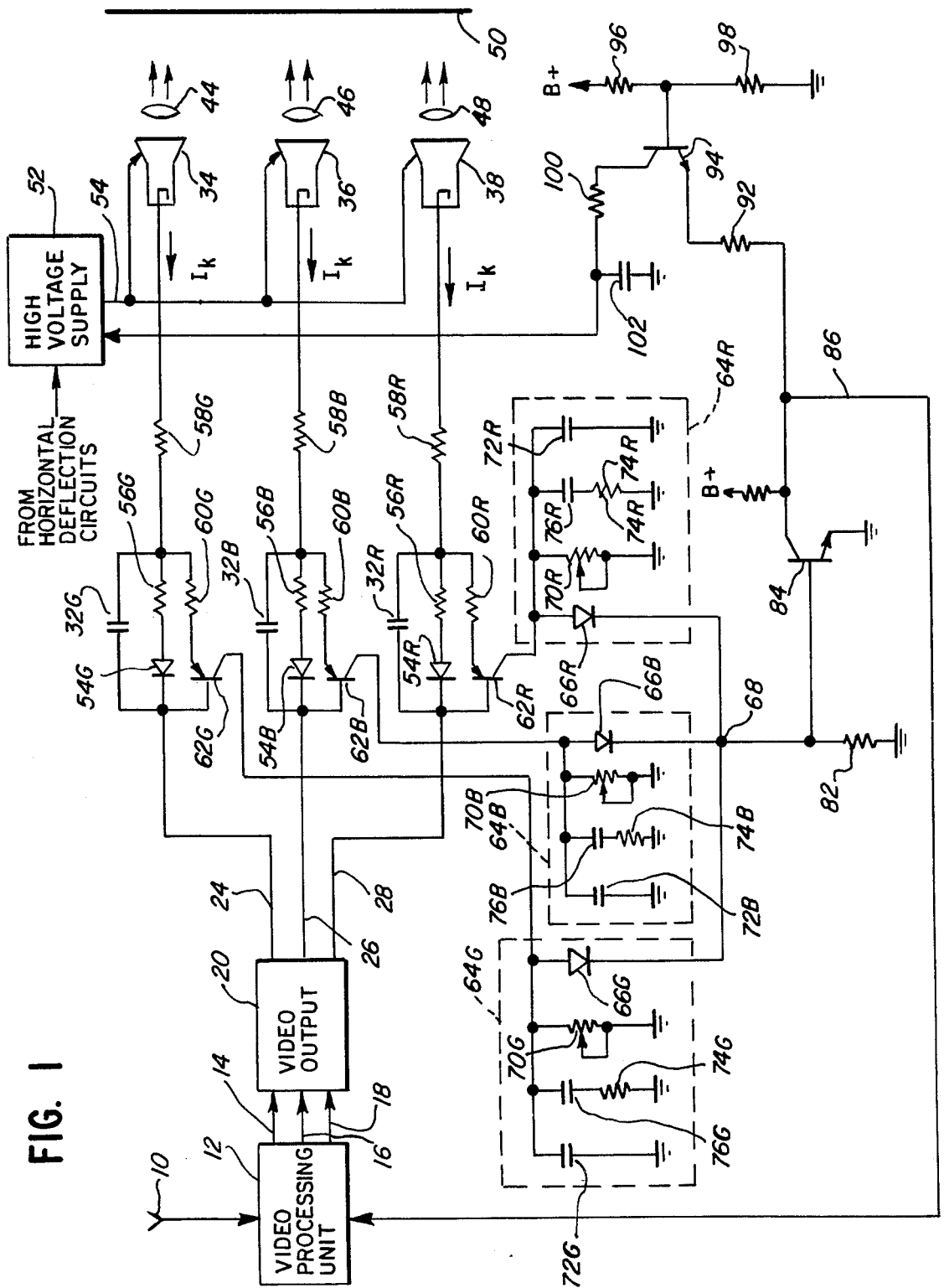
FIG. 1 is a schematic circuit diagram of an automatic beam current limiting circuit in accordance with the present invention.

Referring now to FIG. 1, there is shown a projection color television receiver including a video processing unit 12 for receiving radio frequency television signals from an antenna 10 and for processing these signals in a conventional and well known manner for developing output green, blue and red color signals on conductors 14, 16 and 18 respectively. Each color signal is amplified by a respective output video amplifier comprising a video output stage 20, the amplified green color signal being developed on a conductor 24, the blue color signal on a conductor 26 and the green color signal on a conductor 28.

The amplified green, blue and red color signals developed on conductors 22, 24 and 26 are coupled to the cathodes of three cathode ray tubes 34, 36 and 38 respectively, each cathode ray tube developing a corresponding cathode current $I_k$ for including an amplitude modulated electron beam resulting in the generation of light rays which are focused by a series of focusing lenses 44, 46 and 48 onto a screen 50 for reproducing a color image reflecting the received television signal. A high voltage supply 52 provides a high operating voltage on an output conductor 54 in response to the horizontal flyback pulses occurring during the horizontal retrace intervals of the television signal, this high operating voltage being coupled to the anode of each of the three cathode ray tubes. While not shown in the drawings, each of the cathode ray tubes is also supplied with suitable deflection signals from video processing unit 12 for horizontally and vertically deflecting the electron beam emitted from its cathode across the tube's screen in a conventional manner.

Automatic beam current limiting is achieved according to the invention by sensing the cathode current $I_k$, which is equivalent to the beam current, developed in the cathode of each of the cathode ray tubes 34, 36 and 38 and controlling the gain or drive of video processing unit 12 in accordance with the largest of the sensed cathode currents. In addition, should the largest sensed cathode or beam current exceed a predetermined value even though the gain of video processing unit 12 has been reduced to its lowest level, the beam current limiting circuit will automatically shutdown high voltage supply 52 thereby disabling the operation of cathode ray tubes 34, 36 and 38.

More particularly, the green video signal developed on conductor 24 is coupled to the cathode of its associated cathode ray tube 34 through a diode 54G and a series connected resistor 56G for inducing a corresponding cathode current $I_k$ which flows through a cathode resistor 58G. The resulting cathode current $I_k$ flowing through cathode resistor 58G is divided approximately equally between a first current path comprising the series combination of diode 54G and resistor 56G and a second current path comprising the series combination of a resistor 60G and the emitter-base junction of a PNP transistor 62G. The induced collector current of transistor 62G is therefore proportional to the beam or cathode current $I_k$ of cathode ray tube 34. The beam of cathode currents $I_k$ developed in cathode ray tubes 36 and 38 in response to the blue and red video signals developed on conductors 26 and 28 are individually sensed in an identical manner. Therefore, the blue video signal developed on conductor 26 is coupled to the cathode of cathode ray tube 26 through a diode 54B and a series connected resistor 56B for inducing a flow of cathode current in a cathode resistor 58B. The cathode current flowing through resistor 58B is, as before, divided approximately equally between a first current path comprising the series combination of diode 54B and resistor 56B and a second current path comprising the series combination of a resistor 60B and the emitter-base junction of a PNP transistor 62B. As a consequence, the induced collector current of transistor 62B is proportional to the beam or cathode current of cathode ray tube 36. An identical arrangement of components, i.e. a diode 54R, a plurality of resistors 56R, 58R and 60R and a PNP transistor 62R, are connected between conductor 28 developing the red video signal and the cathode of cathode ray tube 38 whereby the collector current of transistor 62R is proportional to the beam or cathode current of cathode ray tube 38.

The collector current developed in each of the transistors 62G, 62B and 62R is coupled to a respective sensing circuit 64G, 64B and 64R, each of the sensing circuits being identically configured for developing a direct current voltage proportional to the average value of the associated collector current and therefore to the average value of the corresponding cathode current $I_k$. For example, sensing circuit 64G comprises a diode 66G connected between the collector of transistor 62G and a common node 68 and a lead-lag filter consisting of a potentiometer 70G, a capacitor 72G and the series combination of a resistor 74G and a capacitor 76G, each of which is connected between the collector of transistor 62G and a point of ground potential. The lead-lag filter of sensing circuit 64G, in association with an AC by-pass capacitor 32G connected in parallel across the series combination of diode 54G and resistor 56G, functions to average the collector current of transistor 62G and to develop a corresponding direct current voltage at the anode of diode 66G, this direct current voltage thereby reflecting the beam current produced in cathode ray tube 34 in response to the green video drive signal developed on conductor 24. Each of the remaining sensing circuits 64B and 64R is equivalent to sensing circuit 64G whereby a direct current voltage reflecting the beam current produced in cathode ray tube 36 is developed at the anode of diode 66B of sensing circuit 64B and a direct current voltage reflecting the beam current produced in cathode ray tube 38 is developed at the anode of diode 66R of sensing circuit 64R.

In operation, potentiometers 70G, 70B and 70R are adjusted for setting the desired level of limiting beam current, typically about 400 microamperes, of the cathode ray tubes 34, 36 and 38, i.e. the level of beam current necessary to render the associated one of diodes 66G, 66B and 66R conductive. As a consequence, when the selected level of limited beam current is generated in any one of the cathode ray tubes 34, 36 and 38, the corresponding cathode current $I_k$ results in the development of a collector current in the associated one of transistors 62G, 62B and 62R sufficient for developing a diode anode voltage for rendering the corresponding one of diode 66G, 66B and 66R conductive, the remaining two diodes being reverse biased. Consider, for example, the production of a white field on screen 50 for which case the green video signal is normally larger than the blue and red video signals. As the cathode drive voltage supplied to cathode ray tube 34 increases, see FIG. 2, the resulting cathode current reaches the selected limiting level of 400 microamperes at point 80. At this level of green beam current, blue and red beam currents of 240 and 288 microamperes respectively are generated in cathode ray tubes 36 and 38 in order to produce the white field display. If the drive voltages supplied to the cathode ray tubes attempt to increase beyond the values yielding the foregoing beam currents, the diode 66G, 66B or 66R associated with the largest beam current, in this case diode 66G, will be rendered conductive with the other two diodes being reverse biased. The direct current voltage developed at the anode of the conducting diode, less the diode voltage drop, will therefore be coupled to common node 68 and therefrom through a resistor 82 for causing a normally non-conductive transistor 84 to conduct. The potential at the collector of transistor 84 consequently decreases with the reduced potential being fed back by a conductor 86 for reducing the gain or drive of video processing unit 12. The level of the video drive signals on conductors 14, 16 and 18 are thereby decreased so as to limit the value of the largest of the three beam currents to 400 microamperes. It will be appreciated that, however, while the largest beam current, in this case the beam current associated with the green video drive signal, is limited to 400 microamperes, the total combined beam currents of the three cathode ray tubes is 928 microamperes. In this manner, the individual beam currents of the cathode ray tubes are each limited to a value of 400 microamperes to prevent damage to the plastic lenses 44, 46 and 48 while, at the same time, the sum of the beam currents is allowed to reach a level of 928 microamperes to enable the production of an acceptable white field image.

With further reference to the white field example described above, if the video drive voltages supplied to the cathodes of tubes 34, 36 and 38 continue to increase, the induced cathode currents will likewise increase as well as the collector currents of transistors 62G, 62B and 62R. The direct current voltages at the anodes of diodes 66G, 66B and 66R will therefore also proportionately increase with the voltage at the anode of diode 66G remaining larger than the voltages at the anodes of diodes 66B and 66R. Therefore, diode 66G will remain conductive developing an increased voltage at common node 68 while diodes 66B and 66R will remain reverse biased. The conduction of transistor 84 is consequently increased further reducing the potential at its collector electrode whereby the gain of video processing unit 12 is further reduced to limit the beam current in cathode ray tube 34 to 400 microamperes. Thus, in general terms, the circuit is effective for automatically reducing the gain or drive of video processing unit 12 to correspondingly reduce the video drive signals developed on conductors 14, 16 and 18 by an amount sufficient to limit the largest of the three beam currents to a level of 400 microamperes. And, since the limiting action is effected only in response to the largest of the three beam currents, the amperage of the combined beam currents may substantially exceed the 400 microampere individual beam current limiting level.

Due, for example, to the catastrophic failure or the like of a system component, the video drive voltage coupled to the cathode of one or more of the cathode ray tubes 34, 46 or 38 may increase to a level producing an individual cathode or beam current greater than the desired limiting value even though the gain of video processing unit 12 has been reduced to its lowest level. In this situation, which is illustrated in FIG. 2 at point 90, it is desirable to completely disable cathode ray tubes 34, 36 and 38 to prevent any damage thereto. In accordance with the present invention, this effect is achieved by shutting down high voltage supply 52 in response to the largest of the individual beam currents exceeding a selected amperage level.

Referring to FIG. 1, the collector of transistor 84 is connected through a current limiting resistor 92 to the emitter of a transistor 94. A voltage divider comprising resistors 96 and 98 develops a reference potential which is applied to the base of transistor 94. The collector of transistor 94 is connected to the shut-down input of high voltage supply 52 through a low pass filter composed of a resistor 100 and a capacitor 102. In operation, as the video drive signals supplied to the cathodes of cathode ray tubes 34, 36 and 38 increase, the voltage developed at the collector of transistor 84 will be fed back by conductor 86 for controlling video processing unit 12 to maintain the desired level of limited individual beam current as previously described until the minimum gain or drive setting of video processing unit 12 is reached. If the video drive signals continue to increase, the voltage coupled to the emitter of transistor 94 from the collector of transistor 84 will decrease to a point causing transistor 94 to become conductive, this point being determined by the reference potential coupled to the base of the transistor. As a consequence of the conduction of transistor 94, current will flow through resistor 100 to the shut-down input of high voltage supply 52 inhibiting the supply of anode voltage and disabling cathode ray tubes 34, 36 and 38.

What has thus been shown is an improved automatic beam current limiting circuit which is operative for limiting the largest of a plurality of beam currents to a desired level while allowing the combined or total beam currents to substantially exceed this limiting level. This circuit is also effective for inhibiting the generation of any beam currents when the largest individual beam current exceeds a selected safe level.

Although this invention has been described with reference to a particular embodiment, various additional modifications can be made within the scope of the invention. For example, while the invention is preferably used in association with a projection television system, it may also be practiced with a conventional three-gun color television receiver in which case the cathode current of each gun is individually monitored.

What is claimed is:

1. In a television receiver of the type having an adjustable video processing unit for developing green, red and blue video signals and image display means for developing an individual electron beam current in response to each respective one of said video signals, the improvement comprising:
   means for sensing the level of each of said individual beam currents;
   means responsive to said sensing means for developing a control signal reflecting the level of the largest of said sensed individual beam currents; and
   means responsive to said control signal for adjusting said video processing unit for limiting the level of the largest of said sensed individual beam currents to a first predetermined value.

2. The improvement according to claim 1 including means responsive to said control signal for inhibiting the development of said beam currents in response to the level of the largest of said sensed beam currents exceeding a second predetermined value.

3. The improvement according to claim 1 wherein said sensing means comprises means connected for developing first, second and third current signals each being proportional to the level of a respective one of said beam currents.

4. The improvement according to claim 3 wherein said control signal developing means comprises means for converting each of said first, second and third current signals to a corresponding direct current voltage and means for selecting the largest of said direct current voltages for developing said control signal.

5. The improvement according to claim 4 wherein said selecting means comprises first, second and third diodes each having an anode terminal connected to a respective one of said direct current voltages and each having a cathode terminal, said cathode terminals being connected in common for developing said control signal.

6. The improvement according to claim 2 wherein said television receiver includes a high voltage supply enabling the development of said individual electron beam currents, said beam current inhibiting means comprising means responsive to said control signal for disabling said high voltage supply in response to the level of the largest of said sensed beam currents exceeding said second predetermined value.

7. In a television receiver of the type having an adjustable video processing unit for developing green, blue and red video signals and image display means including first, second and third cathode electrodes each responsive to a respective one of said green, blue and red video signals for developing a corresponding cathode current, the improvement comprising:

means coupled to said cathode electrodes for developing first, second and third control signals each representing a respective one of said cathode currents;

means for developing a limit control signal in response to one of said first, second or third control signals assuming a value representing a cathode current exceeding a first predetermined level, said limit control signal being proportional to said one of said first, second or third control signals; and feedback means responsive to said limit control signal for adjusting said video processing unit for limiting the level of cathode current represented by said one of said first, second or third control signals to said first predetermined level.

8. The improvement according to claim 7 wherein said television receiver includes high voltage supply means enabling the development of said cathode currents and including means responsive to said limit control signal for disabling said high voltage supply means for inhibiting the development of said cathode currents in response to the level of cathode current represented by said one of said first, second or third control signals exceeding a second predetermined level.

9. The improvement according to claim 7 wherein said control signal developing means comprises means for developing first, second and third current signals each being proportional to the level of a respective one of said cathode currents and means for converting each of said current signals to a corresponding direct current voltage.

10. The improvement according to claim 9 wherein said limit control signal developing means comprises first, second and third diodes each having an anode terminal connected to a respective one of said direct current voltages and each having a cathode terminal, said cathode terminals being connected in common for developing said limit control signal.

* * * * *